United States Patent
Tamura et al.

(10) Patent No.: US 12,458,362 B2
(45) Date of Patent: Nov. 4, 2025

(54) CLIP DEVICE AND CONNECTION METHOD OF CLIP UNIT AND ACTUATOR

(71) Applicant: OLYMPUS CORPORATION, Hachioji (JP)

(72) Inventors: Toshinori Tamura, Hachioji (JP); Kensuke Uesaka, Hachioji (JP); Ryu Yorita, Hachioji (JP); Yasuyuki Fujimoto, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 422 days.

(21) Appl. No.: 17/965,490

(22) Filed: Oct. 13, 2022

(65) Prior Publication Data
US 2023/0035426 A1 Feb. 2, 2023

Related U.S. Application Data

(63) Continuation of application No. PCT/JP2020/016405, filed on Apr. 14, 2020.

(51) Int. Cl.
*A61B 17/122* (2006.01)
*A61B 17/00* (2006.01)
*A61B 17/128* (2006.01)

(52) U.S. Cl.
CPC ........ *A61B 17/122* (2013.01); *A61B 17/1285* (2013.01); *A61B 2017/00336* (2013.01)

(58) Field of Classification Search
CPC ................ A61B 17/1285; A61B 90/03; A61B 2090/034; A61B 2017/00292; A61B 2017/00367; A61B 2017/00477; A61B 2017/12004; A61B 17/122; A61B 17/128
See application file for complete search history.

(56) References Cited

U.S. PATENT DOCUMENTS

2019/0104926 A1* 4/2019 Osaka .................. A61B 1/0057

FOREIGN PATENT DOCUMENTS

| CN | 202699217 U | 1/2013 |
|---|---|---|
| JP | 2008-289524 A | 12/2008 |
| JP | 3159939 U | 6/2010 |
| WO | 2018/011847 A1 | 1/2018 |

OTHER PUBLICATIONS

Jul. 14, 2020 International Search Report issued in International Patent Application No. PCT/JP2020/016405.

* cited by examiner

*Primary Examiner* — Mohamed G Gabr
*Assistant Examiner* — Khoa Tan Le
(74) *Attorney, Agent, or Firm* — Oliff PLC

(57) ABSTRACT

A clip device includes an arm portion including a plurality of arms that are biased to an open state; a pressing tube into which a proximal-end portion of the arm portion is accommodated and configured to be able to lock the arm portion in a closed state; an insertion portion connected to a proximal-end opening of the pressing tube at a distal end of the insertion portion; a power transmission member extending through the insertion portion; a link configured to detachably connect a distal-end portion of the power transmission member and a proximal-end portion of the arm portion; a first stopper configured to regulate the distal-end portion of the power transmission member from protruding from a distal-end opening of the pressing tube, and a switching portion configured to switch the clip device between a first state and a second state.

20 Claims, 12 Drawing Sheets

CLIP DEVICE AND CONNECTION METHOD OF CLIP UNIT AND ACTUATOR

CROSS REFERENCE TO RELATED APPLICATION

This application is a continuation application of PCT International Application No. PCT/JP2020/016405, filed Apr. 14, 2020. The content of the PCT International Application is incorporated herein by reference.

TECHNICAL FIELD

The present disclosure relates to a clip device and a connection method of a clip unit and an actuator.

BACKGROUND

In an endoscopic treatment, a clip unit that can ligate the resection portion after the treatment for the hemostasis is used. The clip unit includes a clip for clamping the resection portion and the like, and a pressing tube for accommodating the clip and locking the clip in a closed state.

In a case in which the clip has a self-expanding force so as to be biased to an open state, it is possible for the surgeon to return the clip to the open state to re-grasp the resection portion before the clip clamping the resection portion is accommodated in the pressing tube and locked in the closed state.

For example, a medical clip cartridge can refill (reload) a new medical clip into the catheter tube when the clip is removed. The clip is refilled with a hook protruding from the distal end of the catheter tube.

With regard to the medical clip cartridge described above, the clip being used is not a re-graspable clip having a self-expanding force. In a case in which a clip having the self-expanding force is refilled and used in the medical clip cartridge, the hook connected to the clip may protrude from the distal end of the catheter tube due to the self-expanding force of the clip. As a result, the connection between the clip and the hook may become unstable, or the connection between the clip and the hook may be disconnected.

SUMMARY

According to an aspect of the present disclosure, a clip device includes an arm portion including a plurality of arms that are biased to an open state; a pressing tube to which a proximal-end portion of the arm portion is accommodated and configured to be able to lock the arm portion in a closed state; an insertion portion connected to a proximal-end opening of the pressing tube at a distal end of the insertion portion; a power transmission member being inserted through the insertion portion; a link configured to detachably connect a distal-end portion of the power transmission member and a proximal-end portion of the arm portion; a regulation member configured to regulate the distal-end portion of the power transmission member from protruding from a distal-end opening of the pressing tube, and a switching portion configured to switch the clip device between a first state in which the proximal-end portion of the arm portion and the distal-end portion of the power transmission member are attachable to each other and detachable from each other and a second state in which the proximal-end portion of the arm portion and the distal-end portion of the power transmission member are not attachable to each other and not detachable from each other when the distal-end portion of the power transmission member is regulated from protruding from the distal-end opening of the pressing tube by the regulation member.

Another aspect of the present disclosure includes a connection method of a clip unit and an actuator, wherein the clip unit comprises an arm portion including a plurality of arms that are biased to an open state, and a pressing tube to which a proximal-end portion of the arm portion is accommodated and configured to be able to lock the arm portion in a closed state, and the actuator includes an insertion portion connected to a proximal-end opening of the pressing tube at a distal end of the insertion portion, a power transmission member being inserted through the insertion portion, a link configured to detachably connect a distal-end portion of the power transmission member and a proximal-end portion of the arm portion, and a regulation member configured to regulate the distal-end portion of the power transmission member from protruding from a distal-end opening of the pressing. The method includes switching between a first state in which the proximal-end portion of the arm portion and the distal-end portion of the power transmission member are attachable to each other and detachable from each other and a second state in which the proximal-end portion of the arm portion and the distal-end portion of the power transmission member are not attachable to each other and not detachable from each other when the distal-end portion of the power transmission member is regulated from protruding from the distal-end opening of the pressing tube by the regulation member.

According to a further aspect of the present disclosure, a clip device includes a plurality of arms being openable and closable; a holder having a proximal-end opening and configured to accommodate at least part of the plurality of arms; a sheath connected the proximal-end opening; a wire inserting through the sheath; a link configured to detachably connect the plurality of arms and the wire; and a switching portion configured to switch between a first state in which the plurality of arms and the wire are attachable to each other and detachable from each other and a second state in which the plurality of arms and the wire are not attachable to each other and not detachable from each other when a relative position of the holder and the sheath in a longitudinal direction of the sheath is maintained.

DESCRIPTION OF EMBODIMENTS

Figure 1:
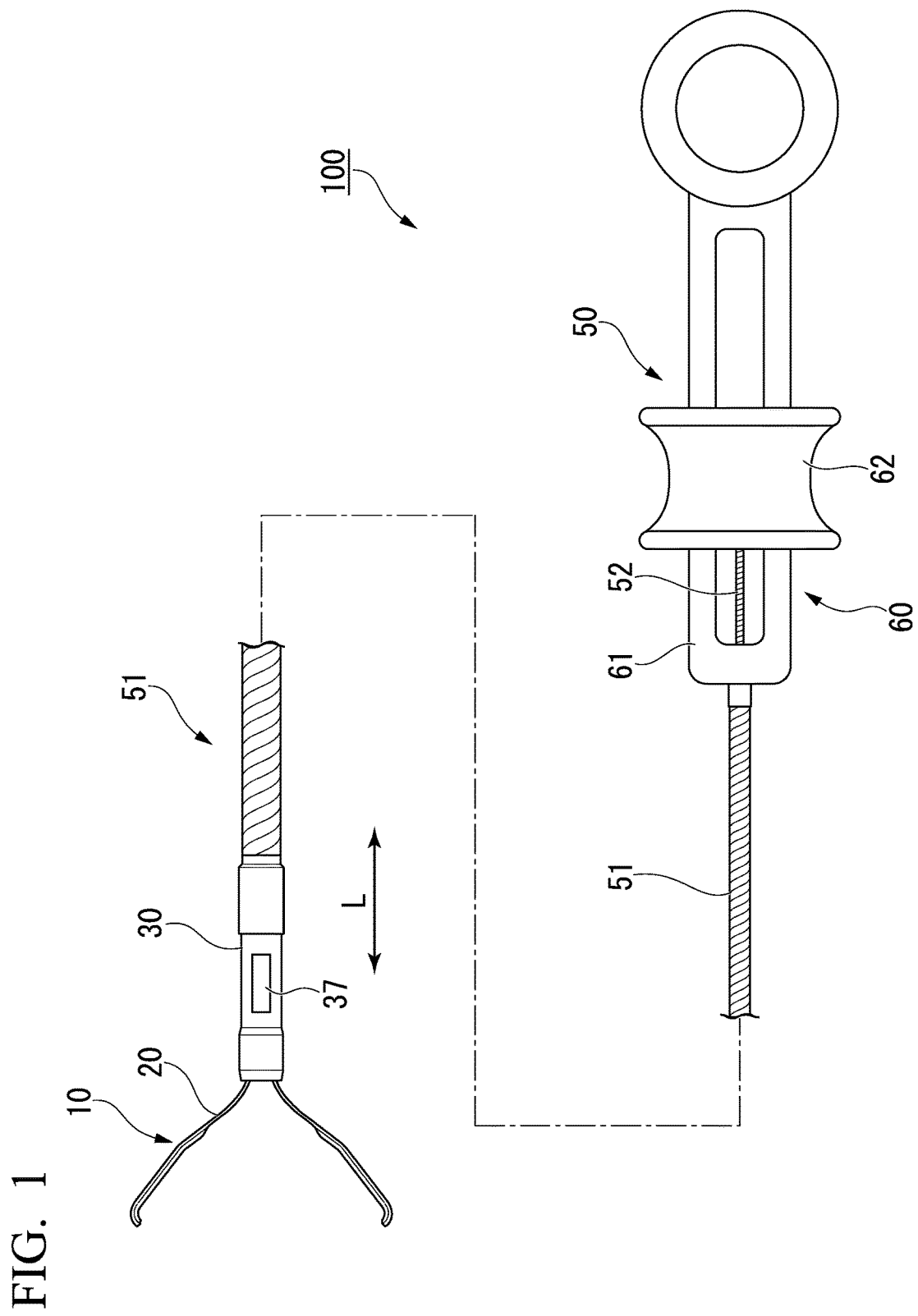
FIG. 1 is a view showing an appearance of a clip device according to an exemplary embodiment of the present disclosure.

An exemplary embodiment according to the present disclosure will be described by referring from FIG. 1 to FIG. 11. FIG. 1 is a view showing an appearance of a clip device 100 according to the present embodiment.

[Clip Device 100]

The clip device 100 includes a clip unit (treatment unit) 10 to be placed in the body and an actuator 50 for operating the clip unit 10. The clip unit 10 is attached to the tip (distal end) of the actuator 50.

[Clip Unit 10]

Figure 2:
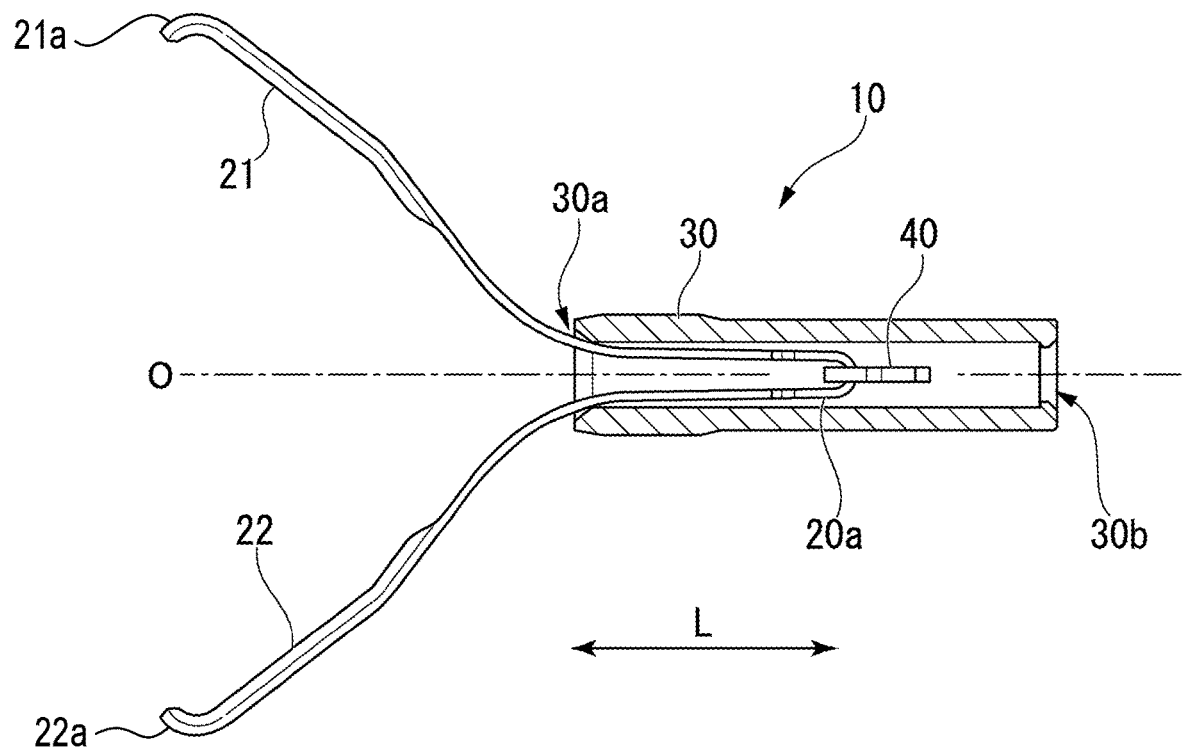
FIG. 2 is a cross-sectional view showing a clip unit of the clip device.

FIG. 2 is a cross-sectional view of the clip unit 10.

The clip unit 10 includes an arm portion 20, a holding pipe (holding member) 30 in which a part of the arm portion 20 is housed, and a connection member 40.

The arm portion 20 includes a pair of arms as a first arm 21 and a second arm 22. The first arm 21 and the second arm 22 have a claw 21a and a claw 22a at distal-end portions thereof, respectively. As shown in FIG. 2, the first arm 21 and the second arm 22 are connected at the proximal-end portion (base) 20a of the arm portion 20. The proximal-end portion 20a is formed in a U shape.

The arm portion 20 is made of a metal containing an alloy. Examples of the material of the arm portion 20 include the stainless steel, the cobalt-chromium alloy, the nickel-titanium alloy and the like.

The first arm 21 and the second arm 22 are expanded in an initial state as shown in FIG. 1. When the first arm 21 and the second arm 22 approach each other from the open state as the initial state, a biasing force to return to the open state is generated due to the elastic force of the material. Therefore, the pair of arms of the arm portion 20 has the self-expanding force.

The pressing tube 30 is a tubular tightening member made of metal, resin, or the like. As shown in FIG. 2, the proximal-end portion 20a of the arm portion 20 is housed in the pressing tube 30. The distal-end portion of the arm portion 20 protrudes from the distal-end opening 30a of the pressing tube 30. The proximal-end opening 30b of the pressing tube 30 is smaller than the distal-end opening 30a.

Figure 3:
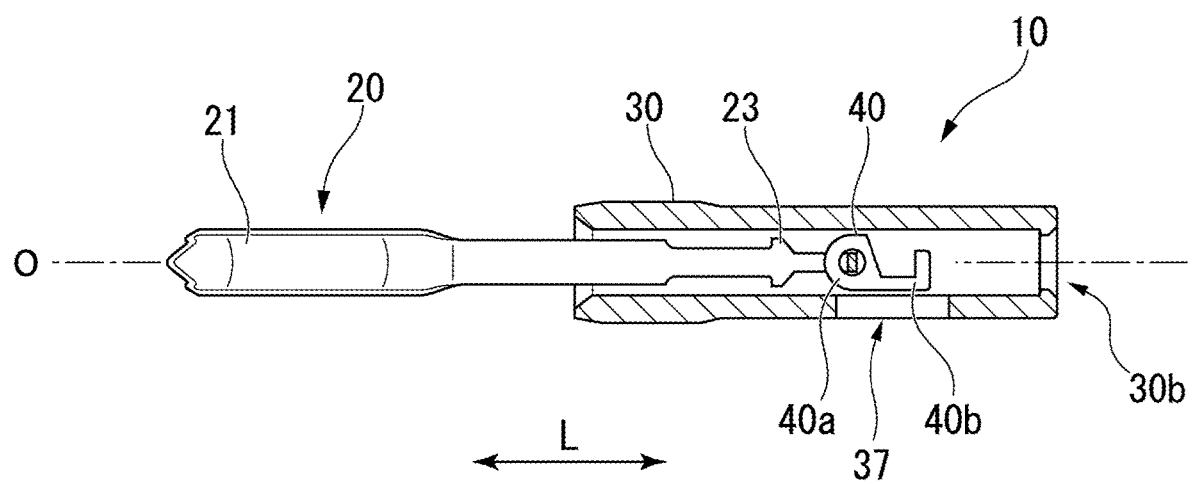
FIG. 3 is a cross-sectional view showing an internal of a pressing tube viewed from a different direction from that in FIG. 2.

FIG. 3 is a cross-sectional view showing the inside of the pressing tube 30 as viewed from a direction different from that of FIG. 2.

A locking portion 23 is provided in an intermediate portion of each arm of the arm portion 20, and the dimension of each arm 21 and arm 22 at the locking portions 23 in the width direction becomes larger (only the first arm is shown in FIG. 3, with the width direction being the up-down direction as viewed in FIG. 3). Each locking portion 23 can pass through the proximal-end opening 30b when the first arm 21 and the second arm 22 approach each other. If the first arm 21 and the second arm 22 are separated from each other after passing through the proximal-end opening 30b, the locking portion 23 cannot pass through the proximal-end opening 30b. As a result, the arm portion 20 is locked in a state (closed state) in which the pair of arms are closed.

The pressing tube 30 further includes a lateral opening 37 penetrating the lateral portion thereof. As shown in FIG. 1, the lateral opening 37 is formed in an elongated hole shape extending in the longitudinal direction L of the clip unit 10.

The connection member 40 is a member rotatably attached to the proximal-end portion 20a. The connection member 40 has a connection hole 40a through which the proximal-end portion 20a is inserted, and an engaging portion 40b that engages with a hook 70 described later. The connection member 40 may be integrally molded with the arm portion 20.

The connection hole 40a is opened in a direction orthogonal to the longitudinal axis O of the clip unit 10. Therefore, the connection member 40 rotates in a direction separating from the longitudinal axis O about an axis orthogonal to the longitudinal axis O with respect to the arm portion 20.

The engaging portion 40b is an L-shaped member. The engaging portion 40b is provided at a position on the proximal-end side away from the connection hole 40a, and rotates about the connection hole 40a as a rotation center. The outer dimension of the engaging portion 40b is smaller than the inner diameter of the lateral opening 37 formed on the lateral portion of the pressing tube 30. The engaging portion 40b can pass through the lateral opening 37.

The engaging portion 40b breaks when a breaking force due to a pulling from 20N (Newton) to 90N for example is applied to the engaging portion 40b by being pulled toward the proximal-end side.

The connection member 40 may be a member that is non-rotatably attached to the proximal-end portion 20a and moves in a direction separating from the longitudinal axis O due to the elastic deformation of the connection portion with the proximal-end portion 20a.

The arm portion 20 as shown in FIG. 1 to FIG. 3 is in the open state due to the biasing force of the arm portion 20. When the arm portion 20 enters the open state by its own biasing force, the engaging portion 40b of the connection member 40 is arranged at a position overlapping the lateral opening 37 in the longitudinal direction L, as shown in FIG. 3. In this state, when the connection member 40 rotates about an axis orthogonal to the longitudinal axis O with respect to the arm portion 20, the engaging portion 40b passes through the lateral opening 37 and protrudes outside.

[Actuator 50]

Figure 4:
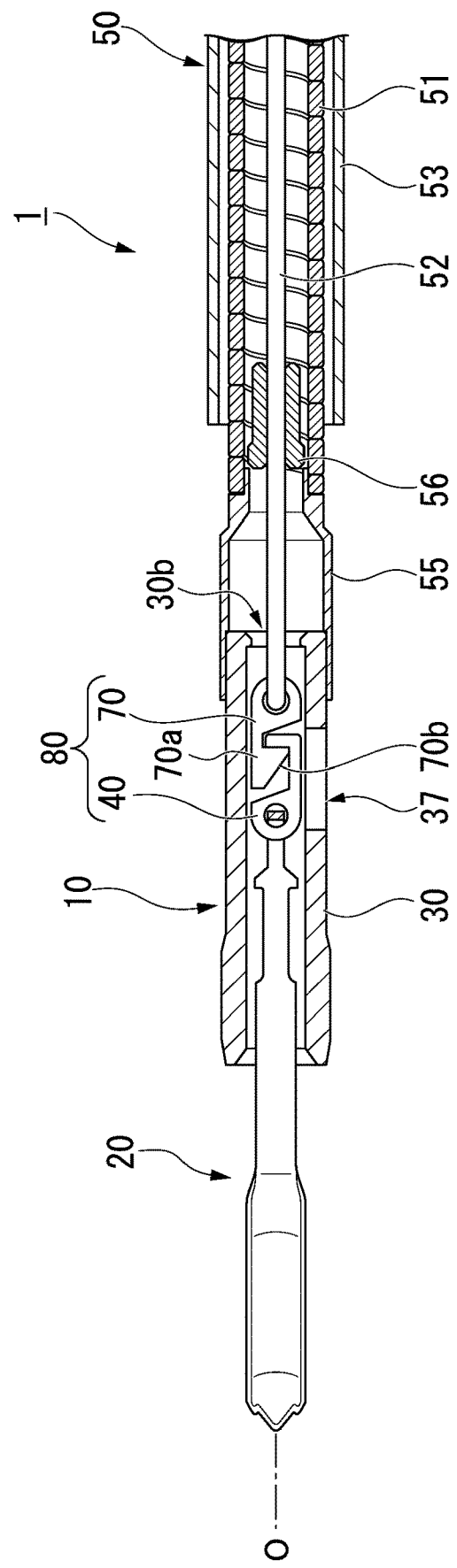
FIG. 4 is a cross-sectional view showing a distal end of an actuator to which the clip unit is mounted.

FIG. 4 is a cross-sectional view of the distal end of the actuator 50 to which the clip unit 10 is attached.

The actuator 50 includes an elongated insertion portion 51, an operation wire (power transmission member) 52 passed through the insertion portion 51, an operation portion 60 connected to the insertion portion 51, and a hook (attachment-detachment portion) 70.

The insertion portion 51 is, for example, a sheath formed of a coil. The distal end of the insertion portion 51 is connected to the proximal-end opening 30b of the pressing tube 30. As shown in FIG. 4, a rigid guide pipe (support member) 55 is attached to the distal end of the insertion portion 51. The inner diameter of the region on the distal-end side of the guide pipe 55 is larger than the outer diameter of the pressing tube 30, and the pressing tube 30 can enter thereinto. The guide pipe (support member) 55 rotatably supports the pressing tube 30 around the longitudinal axis O.

A stopper 56 is attached to the operation wire 52. The shape and dimensions of the stopper 56 are set so as to be unable to enter the guide pipe 55 such that when the stopper 56 comes into contact with the rear end of the guide pipe 55, the operation wire 52 cannot advance any further.

The hook 70 is attached to the distal-end portion of the operation wire 52 and engages with the clip unit 10. The outer dimension of the hook 70 is smaller than the inner diameter of the proximal-end opening 30b. As shown in FIG. 4, the hook 70 enters the pressing tube 30 and the hook 70 and the connection member 40 engage with each other. The hook 70 and the connection member 40 configure a link 80 that connects the actuator 50 and the clip unit 10.

The hook 70 has a distal-end portion 70a that engages with the engaging portion 40b of the connection member 40. The distal-end portion 70a is formed in a substantially L shape. A tapered surface 70b inclined with respect to the longitudinal axis O is formed on the distal-end side of the distal-end portion 70a.

The stopper (regulation member) 56 allows the advancement of the operation wire 52 to a position where the hook 70 is engageable with the connection member 40. The stopper 56 does not allow the advancement of the operation wire 52 from the position where the hook 70 is engageable with the connection member 40 to the position on the distal-end side. Therefore, the hook 70 does not protrude from the distal-end opening 30a of the pressing tube 30.

The operation portion 60 has a main body 61 connected to the insertion portion 51 and a slider 62 slidably attached to the main body 61. As the operation wire 52, for example, a stranded wire made of a metal wire can be used. The proximal-end portion of the operation wire 52 is connected to the slider 62. When the slider 62 is moved with respect to the main body 61, the operation wire 52 can be advanced and retracted in the insertion portion 51.

FIG. 5 to FIG. 8 are a cross-sectional view and a side view of the operations of the clip unit 10 at the time of refilling.

The operations and effects of the clip unit 10 configured as described above at the time of refilling will be described.

Figure 5:
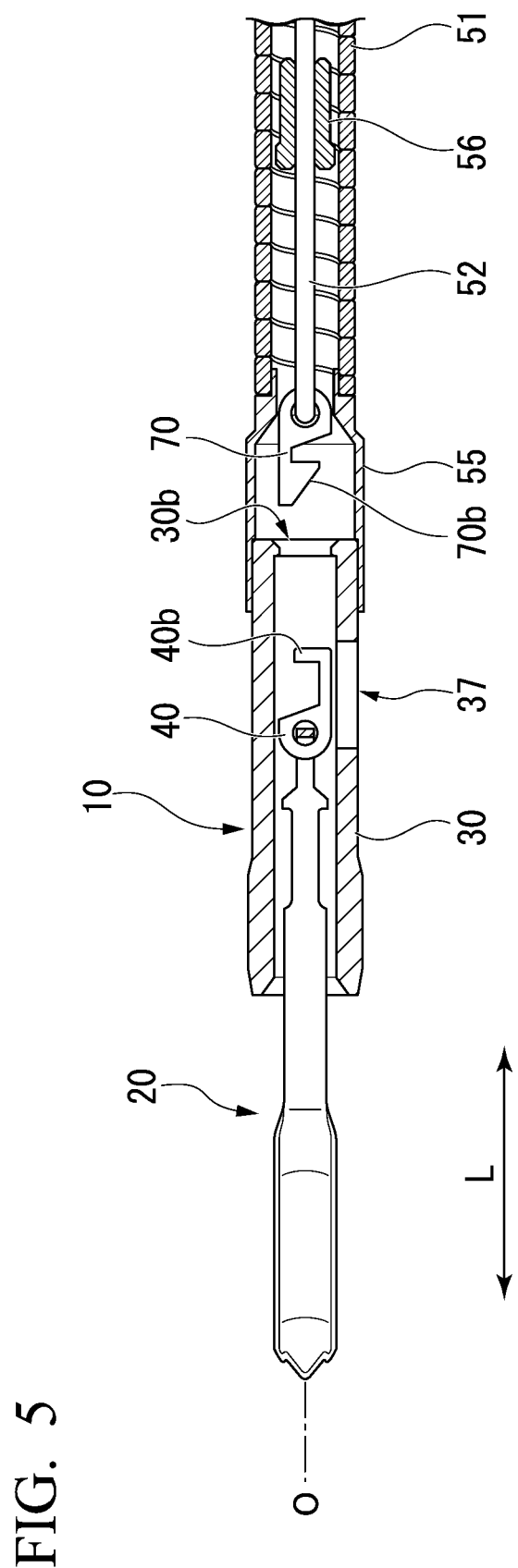
FIG. 5 is a cross-sectional view showing an operation at the time of reloading the clip unit.

As shown in FIG. 5, the user attaches the clip unit 10 to the guide pipe 55 at the distal end of the insertion portion 51. The arm portion 20 is in the open state as the initial state, and the engaging portion 40b of the connection member 40 is arranged at a position overlapping the lateral opening 37 in the longitudinal direction L.

The user rotates the pressing tube 30 around the longitudinal axis O with respect to the arm portion 20, and arranges the connection member 40 at a position where at least part of the engaging portion 40b can pass through the lateral opening 37.

Figure 6:
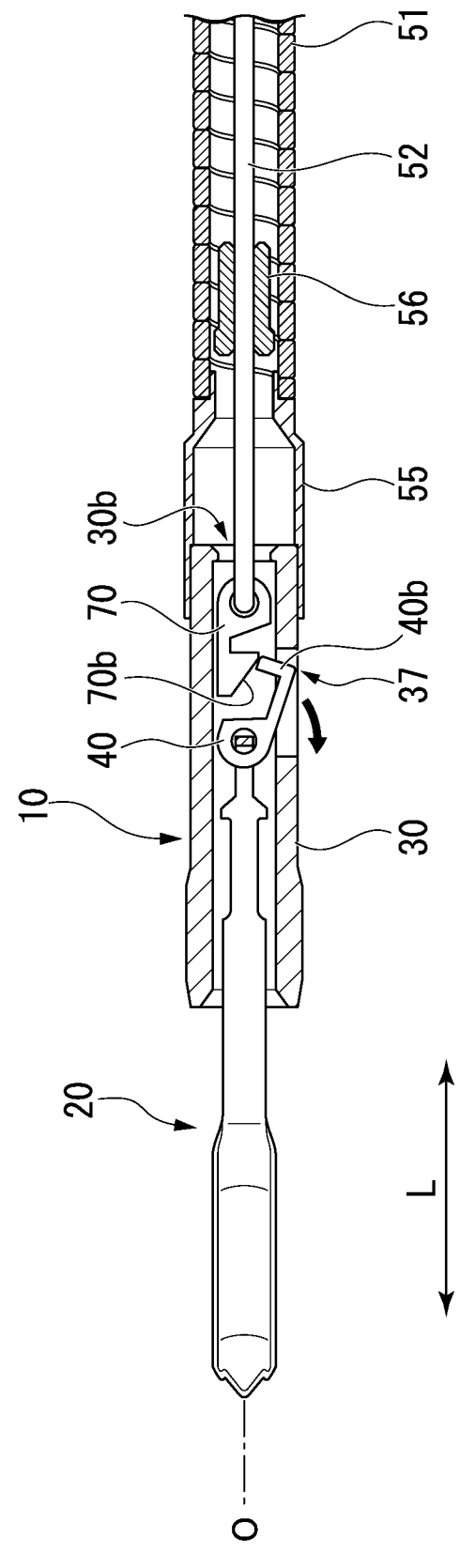
FIG. 6 is a cross-sectional view showing the operation at the time of reloading the clip unit.

As shown in FIG. 6, the user advances the slider 62 with respect to the main body 61 to advance the hook 70. The hook 70 enters the pressing tube 30 through the proximal-end opening 30b of the pressing tube 30. The engaging portion 40b in contact with the tapered surface 70b of the hook 70 rotates about the connection hole 40a as the rotation center. The connection member 40 rotates about an axis orthogonal to the longitudinal axis O with respect to the arm portion 20, and at least part of the engaging portion 40b passes through the lateral opening 37 to protrude.

As shown in FIG. 6, at least part of the engaging portion 40b passes through the lateral opening 37 and protrudes such that the connection member 40 attached to the proximal-end portion 20a of the arm portion 20 and the hook 70 enter the state in which the connection member 40 and the hook 70 are attachable to each other and detachable from each other.

Figure 7:
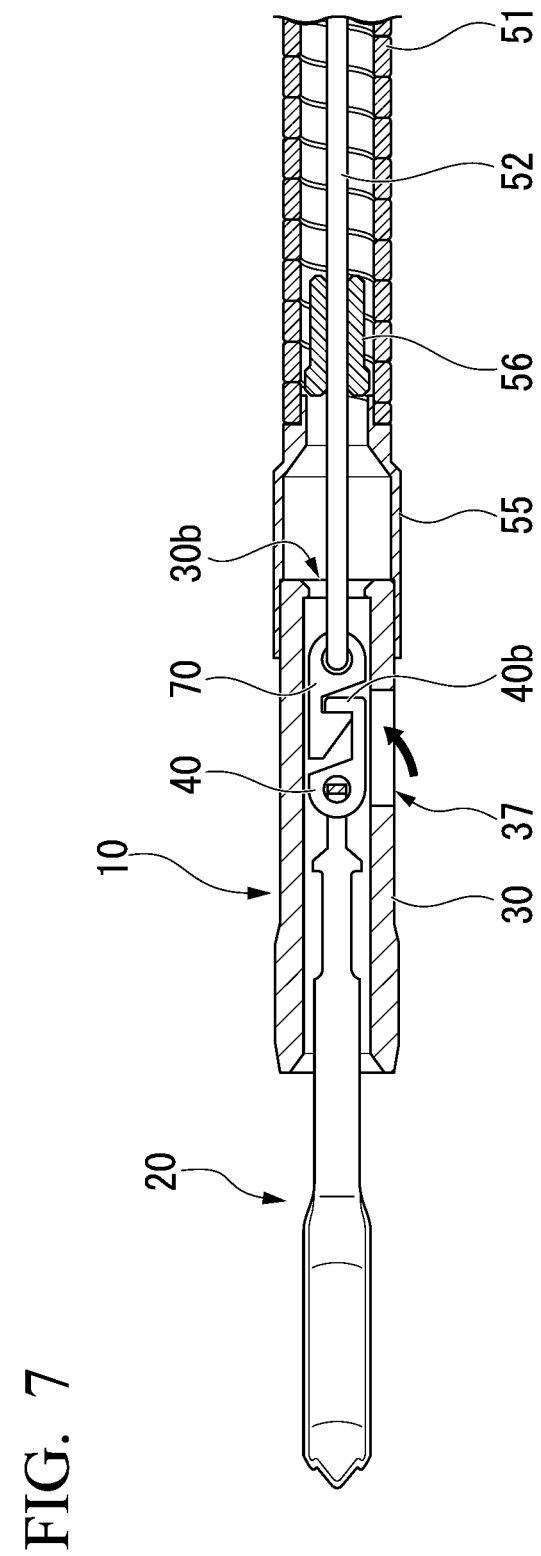
FIG. 7 is a cross-sectional view showing the operation at the time of reloading the clip unit.

As shown in FIG. 7, the user pushes the engaging portion 40b of the connection member 40 protruding from the lateral opening 37 into the pressing tube 30, and engages the engaging portion 40b of the connection member 40 with the hook 70. In a case in which the connection member 40 is a member that moves away from the longitudinal axis O due to elastic deformation, the connection member 40 and the hook 70 enter the state to be attachable to each other and detachable from each other such that the connection member 40 moves to the inside of the pressing tube 30 due to the elastic force of the connection member 40.

Figure 8:
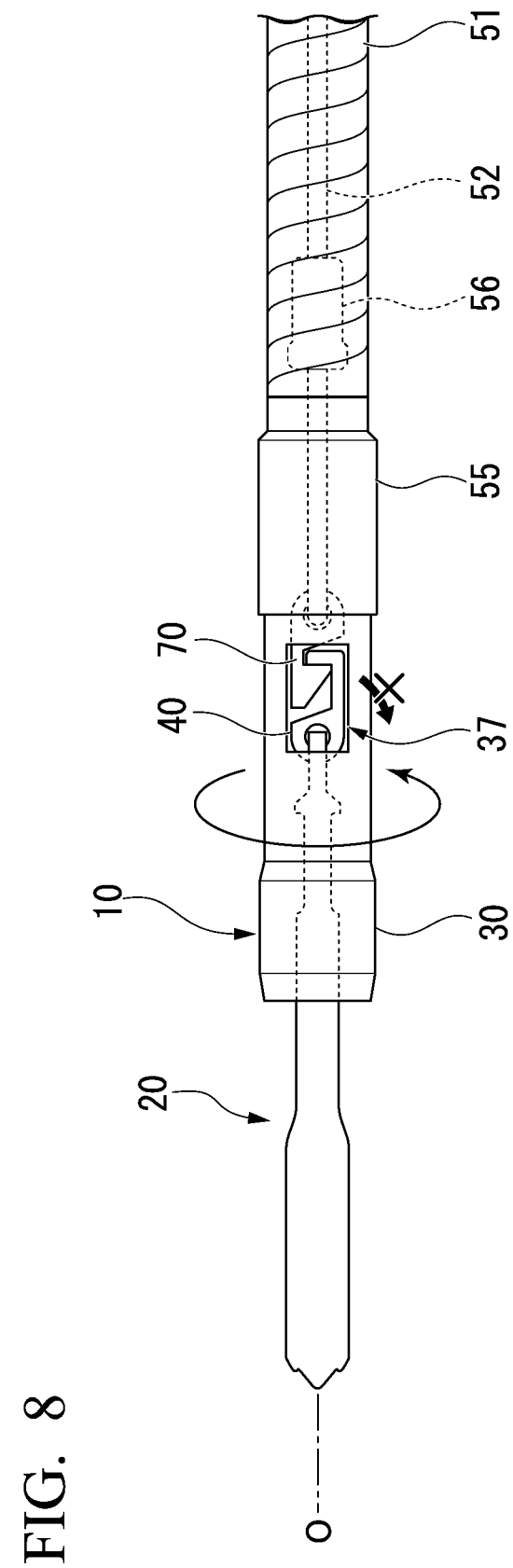
FIG. 8 is a side view showing the operation at the time of reloading the clip unit.

As shown in FIG. 8, the user rotates the pressing tube 30 about the longitudinal axis O with respect to the arm portion 20, and arranges the connection member 40 at the position wherein at least part of the engaging portion 40b cannot pass through the lateral opening 37. As a result, even if the connection member 40 is rotating about an axis orthogonal to the longitudinal axis O with respect to the arm portion 20, at least part of the engaging portion 40b cannot pass through the lateral opening 37. Therefore, the connection member 40 attached to the proximal-end portion of the arm portion 20 and the hook 70 enter the state in which the connection member 40 and the hook 70 are not detachable from each other.

The hook 70 does not protrude from the distal-end opening 30a of the pressing tube 30 due to the stopper 56. Therefore, the hook 70 does not protrude from the distal-end opening 30a, the connection between the arm portion 20 and the hook 70 does not become unstable, and the connection between the arm portion 20 and the hook 70 is not disconnected.

Figure 9:
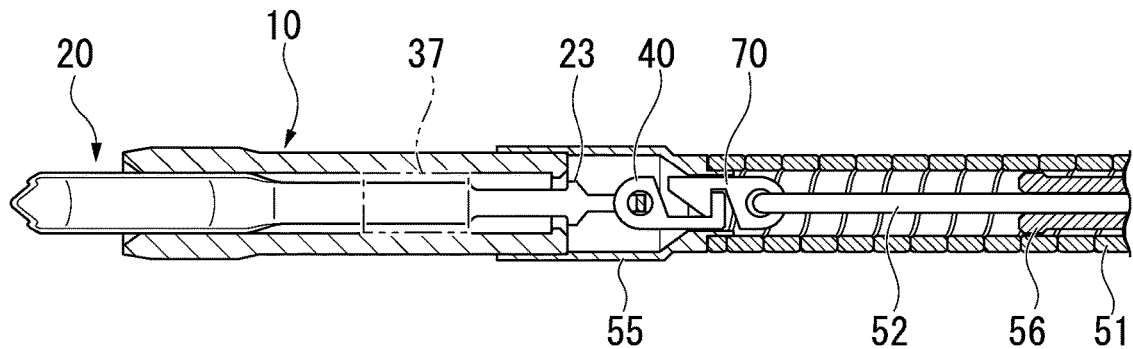
FIG. 9 is a cross-sectional view showing an operation during the usage of the clip device.
Figure 10:
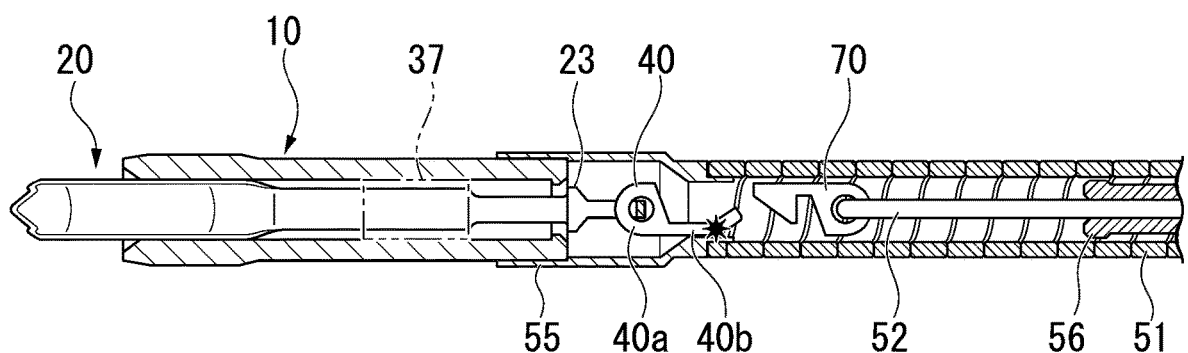
FIG. 10 is a cross-sectional view showing the operation during the usage of the clip device.
Figure 11:
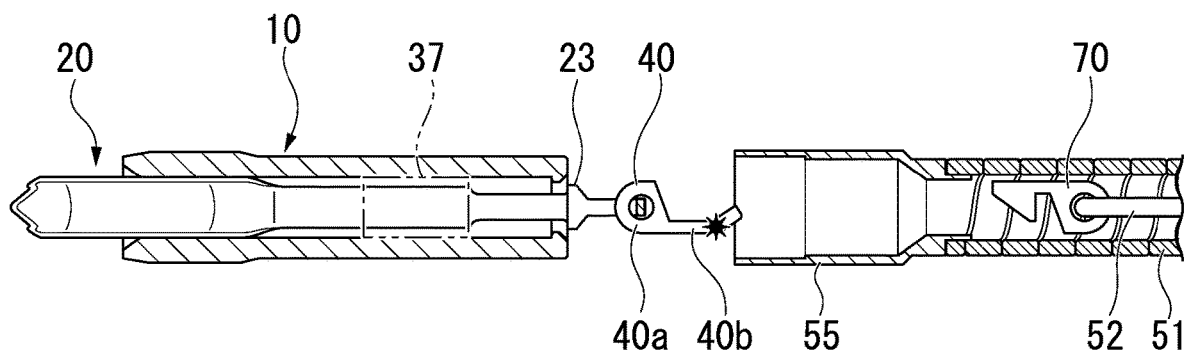
FIG. 11 is a cross-sectional view showing the operation during the usage of the clip device.

FIG. 9 to FIG. 11 are cross-sectional views showing the operations of the clip device 100 at the time of being used.

The operations and effects of the clip device 100 configured as described above when used will be described.

The clip device 100 is introduced into the body via the endoscope channel. When inserting the clip device 100 into the endoscope, the user retracts the slider 62 by a predetermined amount and inserts the clip device 100 in a state in which the arm portion 20 is closed and unlocked. The clip unit 10 with the arm portion 20 closed and the distal-end portion of the insertion portion 51 may be inserted into the endoscope while being accommodated in the outer sheath 53 (see FIG. 4).

When the clip device 100 is protruded from the channel opening at the distal-end of the endoscope, the pulling force with respect to the slider 62 is reduced, and the arm portion 20 advances with respect to the pressing tube 30 due to its own elastic restoration force. As a result, the pair of arm 21 and arm 22 are in the open configuration. When the stopper 56 comes into contact with the rear end of the guide pipe 55, the arm portion 20 cannot advance with respect to the pressing tube 30 such that the arm portion 20 does not fall off from the pressing tube 30 and the open configuration is maintained.

When the user retracts the slider 62 with respect to the main body 61, the operation wire 52 is pulled and the arm portion 20 retracts with respect to the pressing tube 30. As a result, the pair of arms 21, 22 are closed to a closed configuration. The user can ligate the tissue by locating the tissue between the pair of arms 21, 22 and closing the pair of arms 21, 22. By advancing the slider 62 with respect to the main body 61 until the locking operation described later is performed, the pair of arms 21, 22 can be transitioned from the closed configuration to the open configuration again. Therefore, in the clip device 100, the clip unit 10 can be operated by the operation wire 52 to re-grasp the tissue until the locking operation is performed.

When it is determined that the tissue located between the pair of arms 21, 22 is suitable to be ligated, the user performs the locking operation for fixing the arm portion 20 in the closed configuration. In the locking operation, the user further retracts the slider 62 with respect to the main body 61 beyond the range in which the re-grasping can be performed. When the slider 62 retracts, the operation wire 52 is pulled, and the pair of arms 21, 22 enter the pressing tube 30 in substantially parallel with each other while clamping the tissue. Furthermore, the locking portions 23 provided on the pair of arms 21, 22 approach each other to enter a positional relationship in which they can pass through the proximal-end opening 30b of the pressing tube 30.

As shown in FIG. 9, the pair of locking portions 23 that have passed through the proximal-end opening 30b and moved out of the pressing tube 30 are separated from each other again when the force received from the operation wire 52 is weakened, and enter a positional relationship so as to be unable to pass through the proximal-end opening 30b. As a result, the pair of locking portions 23 come into contact with the edge of the proximal-end opening 30b to prevent the arm portion 20 from protruding from the pressing tube 30, and the arm portion 20 is locked to maintain the closed configuration.

The user further pulls the operation wire 52. As shown in FIG. 10, the breaking force due to the pulling from, for example, 20N (Newton) to 90N is applied to the engaging portion 40b such that the engaging portion 40b breaks. On the other hand, since the hook 70 does not break, it can be reused without being exchanged when the clip unit 10 is refilled.

The user retracts the insertion part 51. As a result, as shown in FIG. 11, the clip unit 10 is indwelled in the body in a state in which the tissue is ligated by the clip unit 10.

According to the clip device 100 according to the present embodiment, the re-graspable clip unit 10 having the self-expanding force can be easily refilled. The connection member 40, the lateral opening 37 of the pressing tube 30, and the guide pipe (supporting member) 55 that rotatably supports the pressing tube 30 around the longitudinal axis O configure a "switching portion". The switching portion is configured to switch a state (first state) in which the connection member 40 attached to the proximal-end portion of the arm portion 20 and the hook 70 are attachable to each other and detachable from each other and a state (second state) in which the connection member 40 attached to the proximal-end portion of the arm portion 20 and the hook 70 are not attachable to each other and not detachable from each other in a state in which the distal-end portion of the operation wire 52 is regulated from protruding from the distal-end opening 30a of the pressing tube 30 by the stopper 56, that is, in a state in which the hook 70 (link 80) does not protrude from the distal-end opening 30a of the pressing tube 30.

According to the clip device 100 according to the present embodiment, even in the case in which the arm portion 20 has the self-expanding force, the hook 70 does not protrude from the distal-end opening 30a, the connection between the arm portion 20 and the hook 70 does not become unstable, and the connection between the arm portion 20 and the hook 70 is not disconnected.

Although the present embodiment has been described in detail with reference to the figures, the specific configuration is not limited to what is shown in the figures, and includes design changes and the like within a range that does not deviate from the scope of the present disclosure. Also, the configuration components shown in the above-described embodiment and the modification examples shown below can be appropriately combined and configured.

Modification Example 1

Figure 12:
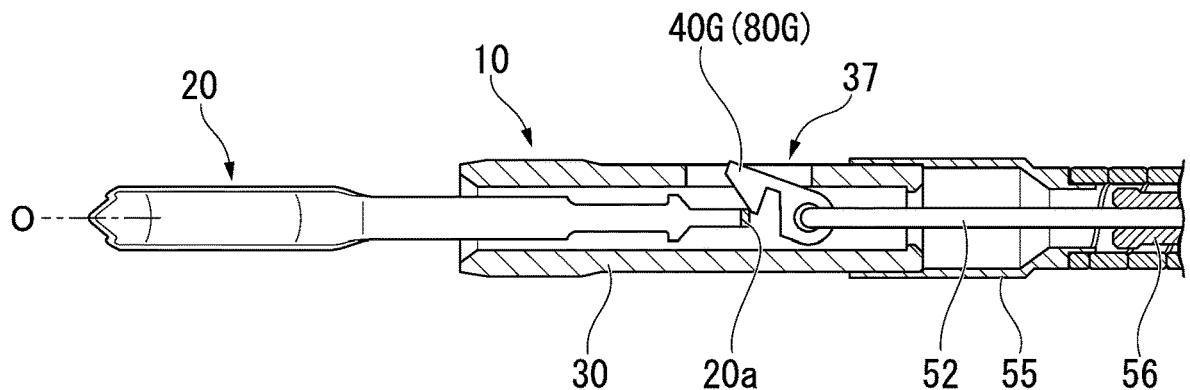
FIG. 12 is a view showing a modification example of a link of the clip device.
Figure 13:
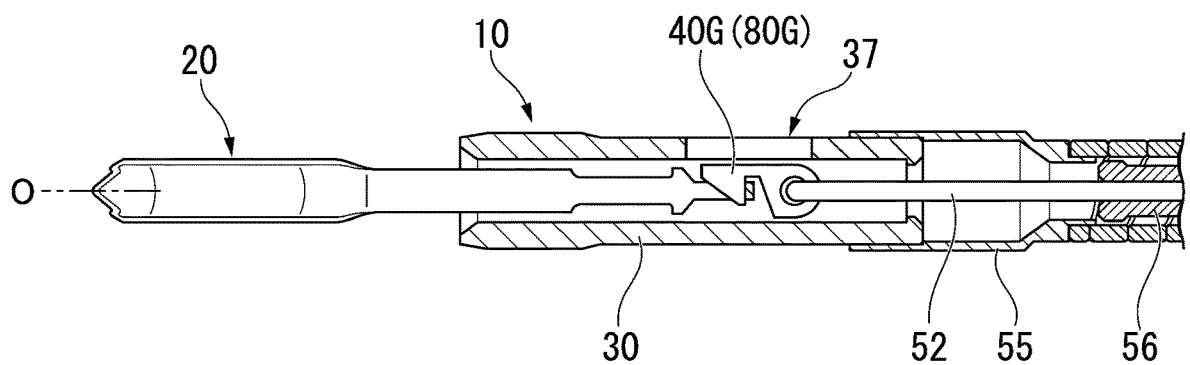
FIG. 13 is a view showing a modification example of the link of the clip device.

For example, in the above-described embodiment, the link 80 is configured of the connection member 40 attached to the proximal-end portion 20a of the arm portion 20 and the hook 70 attached to the distal-end portion of the operation wire 52. The aspect of the link is not limited to this configuration. FIG. 12 and FIG. 13 are views showing a link 80G as a modification example of the link 80. The link 80G does not include the attachment-detachment portion 70, and the link 80G is configured only of a connection member 40G. The connection member 40G is rotatably attached to the distal-end of the operation wire 52. As shown in FIG. 12, at least part of the connection member 40G passes through the lateral opening 37 and protrudes outside such that the connection member 40G and the proximal-end portion 20a of the arm portion 20 are in the state of being attachable to each other and detachable from each other. As shown in FIG. 13, the connection member 40G is pushed into the pressing tube 30 to engage with the proximal-end portion 20a of the arm portion 20.

Modification Example 2

Figure 14:
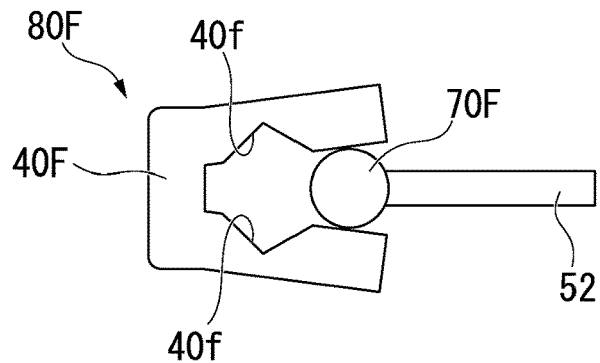
FIG. 14 is a view showing a modification example of a connection member and a hook.
Figure 15:
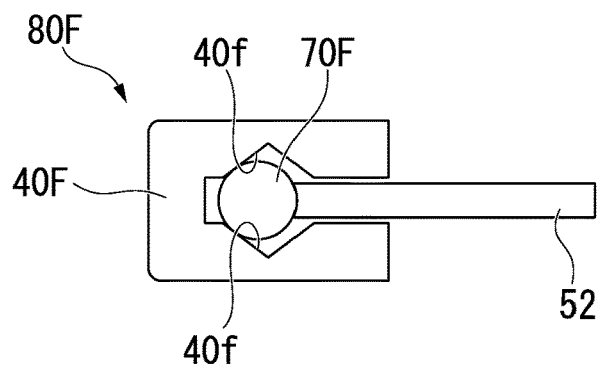
FIG. 15 is a view showing a modification example of the connection member and the hook.

For example, in the above-described embodiment, the connection member 40 is in the state of being attachable to and detachable from the hook 70 since the L-shaped engaging portion 40b rotates. The attachment-detachment configuration of the connection member 40 and the hook 70 is not limited to this configuration. FIG. 14 and FIG. 15 are views showing a connection member 40F and an attachment-detachment portion 70F, which are modification examples of the connection member 40 and the hook 70, respectively. The connection member 40F and the attachment-detachment portion 70F configure a link 80F. The connection member 40F is an open-close member that sandwiches the spherical attachment-detachment portion 70F from both sides thereof. A concave portion 40f that engages with the attachment-detachment portion 70F is formed at the inner side of the connection member 40F.

The user rotates the pressing tube 30 around the longitudinal axis O with respect to the arm portion 20 such that the connection member 40F transitions from the closed state to the open state, and the connection member 40F is arranged at the position where the connection member 40F can pass through the lateral opening 37. As shown in FIG. 14, when the connection member 40F is in the open state, the connection member 40F and the hook 70F are in the state of being attachable to and detachable from each other.

The user rotates the pressing tube 30 around the longitudinal axis O with respect to the arm portion 20 and arranges the connection member 40F at the position where the connection member 40F cannot pass through the lateral opening 37 such that the connection member 40F does not transition from the closed state to the open state. As shown in FIG. 15, when the connection member 40F is maintained in the closed state, the connection member 40F and the hook 70F are in the state in which the connection member 40F and the hook 70F are not attachable to and detachable from each other.

Another exemplary embodiment of the present disclosure will be described with reference to FIG. 16 to FIG. 17. In the following description, the same reference signs will be designated to the configurations common to those already described, and the duplicate description will be omitted. A clip device 100B according to the present embodiment has a different configuration in the switching portion as compared with the clip device 100 according to the embodiment of FIG. 1 to FIG. 11.

Figure 16:
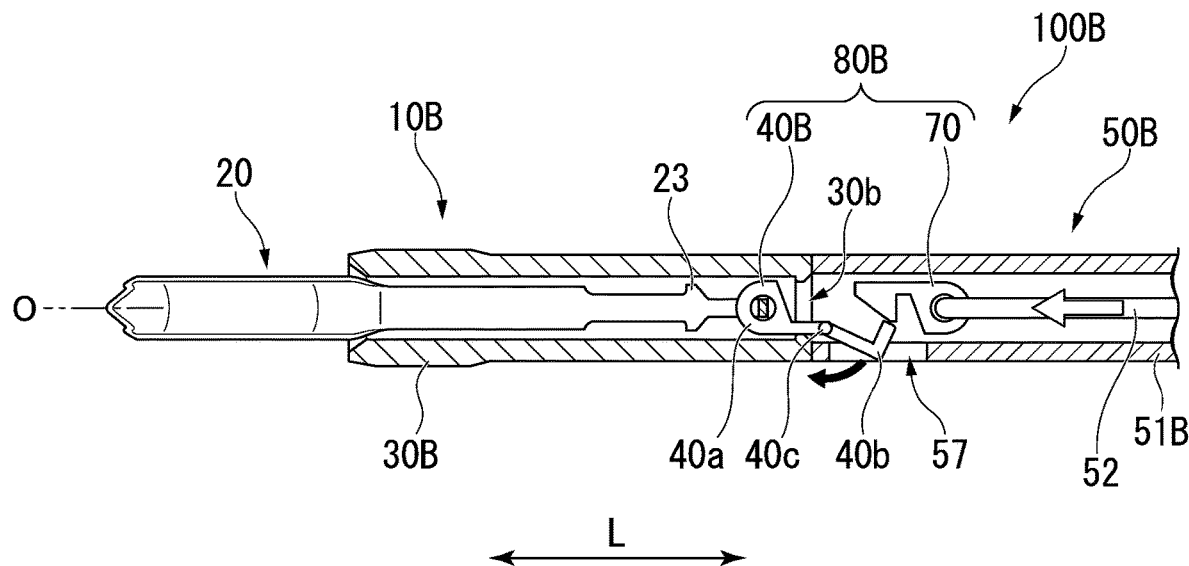
FIG. 16 is a cross-sectional view showing a distal end of a clip device according to an exemplary embodiment of the present disclosure.
Figure 17:
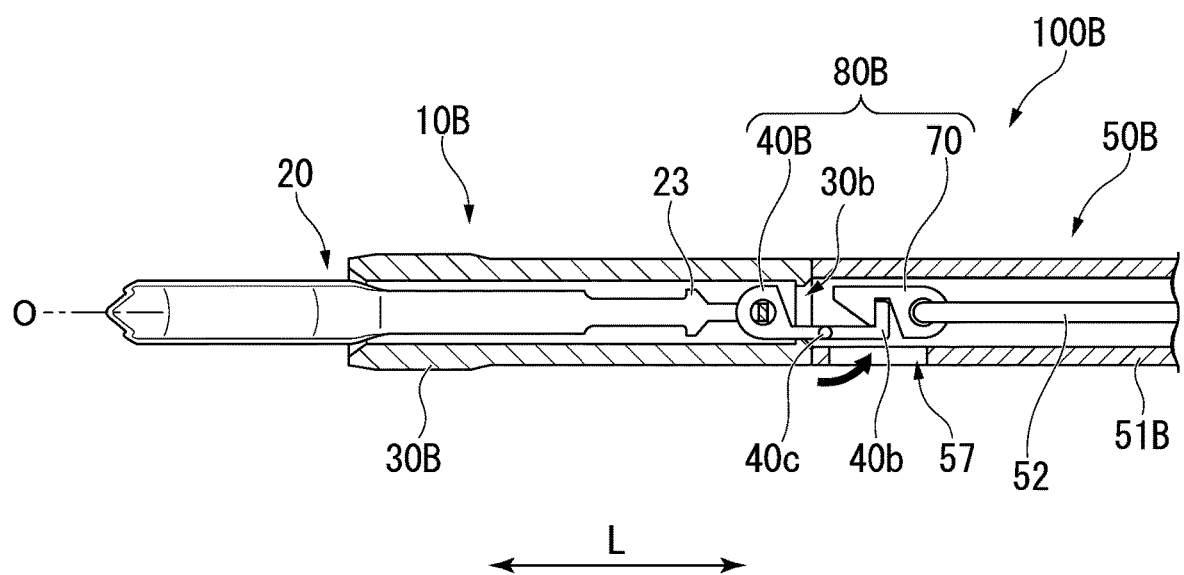
FIG. 17 is a cross-sectional view showing the distal end of the clip device.

FIG. 16 and FIG. 17 are cross-sectional views of the distal end of the clip device 100B.

The clip device 100B includes a clip unit (treatment portion) 10B indwelled in the body and an actuator 50B for operating the clip unit 10B.

The clip unit 10B includes an arm portion 20, a pressing tube (holding member) 30B in which a part of the arm portion 20 is accommodated, and a connection member 40B.

The pressing tube 30B has the same configuration as that of the pressing tube 30 according to the above-described embodiment except that the pressing tube 30B does not include the lateral opening 37.

The connection member 40B is a member rotatably attached to the proximal-end portion 20a. The connection member 40B includes a connection hole 40a through which the proximal-end portion 20a is inserted, an engaging portion 40b that engages with the hook 70, and a rotation member 40c. The connection member 40B and the attachment-detachment portion 70 configure a link 80B.

The rotation member 40c is a member that rotatably supports the L-shaped engaging portion 40b. The engaging portion 40b supported by the rotation member 40c rotates about an axis orthogonal to the longitudinal axis O as the rotation center. In the connection member 40B, the connection hole 40a and the engaging portion 40b are connected via the rotation member 40c, and a length L in the longitudinal direction is longer than that of the connection member 40 according to the above-described embodiment.

The actuator 50B includes an elongated insertion portion 51B, an operation wire (power transmission member) 52 passed through the insertion portion 51B, an operation portion 60 connected to the insertion portion 51B, and a hook (attachment-detachment portion) 70.

The insertion portion 51B is, for example, a sheath formed of a coil. The distal end of the insertion portion 51B is connected to the proximal-end opening 30b of the pressing tube 30B. A lateral opening 57 is formed on the lateral surface near the distal end of the insertion portion 51B. The lateral opening 57 has an elongated hole shape extending in the longitudinal direction L of the clip unit 10B. The lateral opening 57 is an opening having the same size as that of the lateral opening 37 according to the above-described embodiment, and the engaging portion 40b can pass through the lateral opening 57.

The operations and effects at the time of refilling the clip unit 10B configured as described above will be described.

As shown in FIG. 16, the user attaches the clip unit 10B to the distal end of the insertion portion 51B. The arm portion 20 is in the open state as the initial state, and the engaging portion 40b of the connection member 40B protrudes from the proximal-end opening 30b of the pressing tube 30B and is arranged at a position overlapping the lateral opening 57 in the longitudinal direction L.

The user rotates the pressing tube 30 around the longitudinal axis O with respect to the arm portion 20, and arranges the connection member 40B at a position where at least part of the engaging portion 40b can pass through the lateral opening 57.

As shown in FIG. 16, the user advances the slider 62 with respect to the main body 61 to advance the hook 70. The engaging portion 40b in contact with the distal end of the hook 70 rotates about the rotation member 40c as the rotation center. The connection member 40B rotates about an axis orthogonal to the longitudinal axis O with respect to the arm portion 20, and at least part of the engaging portion 40b passes through the lateral opening 57 to protrude.

As shown in FIG. 16, at least part of the engaging portion 40b passes through the lateral opening 57 to protrude such that the connection member 40B attached to the proximal-end portion of the arm portion 20 and the hook 70 are in the state of being attachable to and detachable from each other.

As shown in FIG. 17, the user pushes the engaging portion 40b of the connection member 40B protruding from the lateral opening 57 into the pressing tube 30B, and engages the engaging portion 40b of the connection member 40B with the hook 70.

The user rotates the pressing tube 30B around the longitudinal axis O with respect to the arm portion 20, and arranges the connection member 40 at a position where at least part of the engaging portion 40b cannot pass through the lateral opening 57. As a result, even if the engaging portion 40b is to rotate about an axis orthogonal to the longitudinal axis O with respect to the arm portion 20, at least part of the engaging portion 40b cannot pass through the lateral opening 57. Therefore, the connection member 40B attached to the proximal-end portion of the arm portion 20 and the hook 70 are in the state in which the connection member 40B and the hook 70 are not attachable to and detachable from each other.

According to the clip device 100B according to the present embodiment, similar to the clip device 100 according to the above-described embodiment, it is easy to refill the clip unit 10B having the self-expanding force to be re-graspable. The connection member 40B, the lateral opening 57 of the insertion portion 51, and the guide pipe (supporting member) 55 that rotatably supports the pressing tube 30B around the longitudinal axis O configure the "switching portion". The switching portion is configured to switch a state (first state) in which the connection member 40B attached to the proximal-end portion of the arm portion 20 and the hook 70 are attachable to each other and detachable from each other and a state (second state) in which the connection member 40B attached to the proximal-end portion of the arm portion 20 and the hook 70 are not attachable to each other and not detachable from each other in a state in which the distal-end portion of the operation wire 52 is regulated from protruding from the distal-end opening 30a of the pressing tube 30B by the stopper 56, that is, in a state in which the hook 70 (link 80) does not protrude from the distal-end opening 30a of the pressing tube 30B.

According to the clip device 100B according to the present embodiment, even if in the case in which the lateral opening is formed in the insertion portion 51 rather than in the pressing tube 30B, the clip device 100B can exhibit the same effect as that of the above-described embodiment.

Although the present embodiment of the present disclosure has been described in detail with reference to the figures, the specific configuration is not limited to what is shown in the figures, and includes design changes and the like within a range that does not deviate from the scope of the present disclosure. In addition, the configurational components shown in the above-described embodiments and modification examples can be appropriately combined and configured.

Another exemplary embodiment of the present disclosure will be described with reference to FIG. 18 to FIG. 19. In the following description, the same reference signs will be designated to the configurations common to those already described, and duplicate description will be omitted. A clip device 100C according to the present embodiment has a different configuration in the switching portion as compared with the clip device 100 according to the embodiment of FIG. 1 to FIG. 11.

Figure 18:
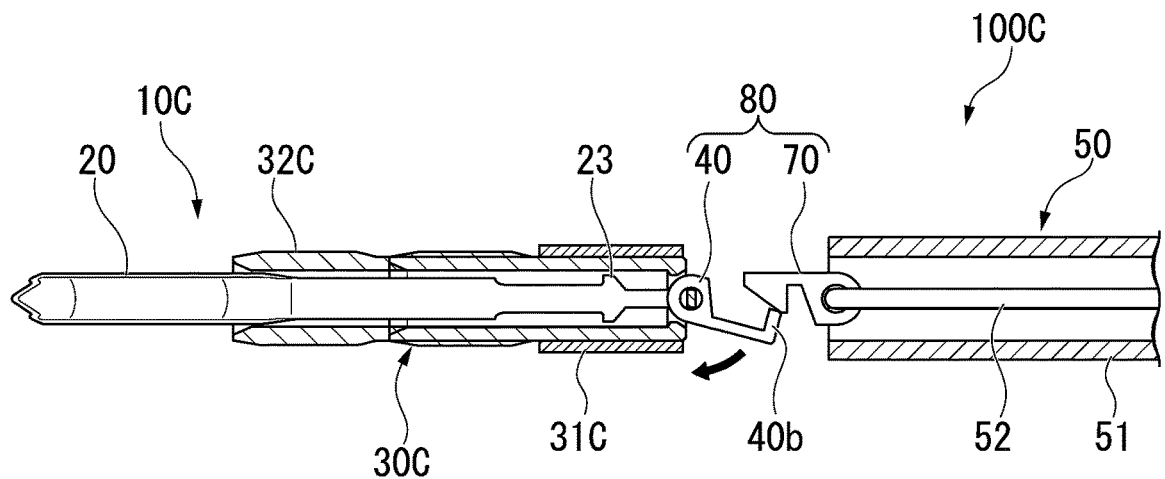
FIG. 18 is a cross-sectional view showing a distal end of a clip device according to an exemplary embodiment of the present disclosure.
Figure 19:
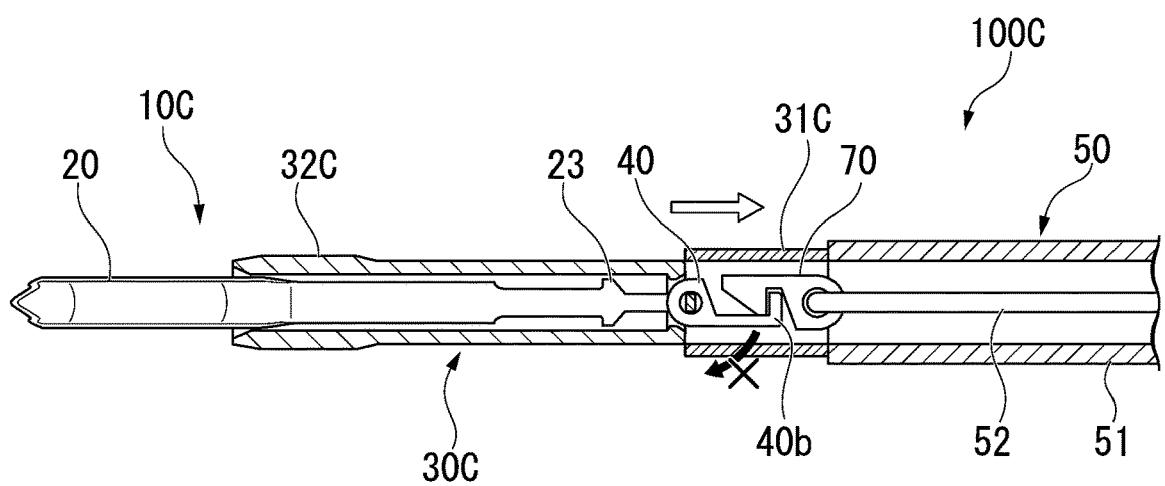
FIG. 19 is a cross-sectional view showing the distal end of the clip device.

FIG. 18 and FIG. 19 are cross-sectional views showing the distal end of the clip device 100C.

The clip device 100C includes a clip unit (treatment unit) 100 indwelled in the body and an actuator 50 for operating the clip unit 100.

The clip unit 100 includes an arm portion 20, a pressing tube (holding member) 30C in which a part of the arm portion 20 is accommodated, and a connection member 40.

The pressing tube 30C further includes a cover member 31C as compared with the pressing tube 30B according to the embodiment of FIG. 16 to FIG. 17. The portion of the pressing tube 30C other than the cover member 31C is referred to as the pressing tube main body 32C.

As shown in FIG. 18 and FIG. 19, the cover member 31C is a tubular member provided on the proximal-end side of the pressing tube 30C. The cover member 31C is fitted to the outer circumferential surface of the pressing tube main body 32C. The cover member 31C is attached to the pressing tube main body 32C so as to be slidable toward the proximal-end side with respect to the pressing tube main body 32C.

The operations and effects of the clip unit 10C configured as described above at the time of refilling will be described.

As shown in FIG. 18, the user slides the cover member 31C toward the distal-end side with respect to the pressing tube main body 32C. When the connection member 40 is exposed to the outside, the connection member 40 attached to the proximal-end portion of the arm portion 20 and the hook 70 are in the state of being attachable to and detachable from each other. As shown in FIG. 18, the user engages the engaging portion 40b of the connection member 40 with the hook 70.

As shown in FIG. 19, the user slides the cover member 31C toward the proximal-end side with respect to the pressing tube main body 32C. Since the connection member 40 is covered with the cover member 31C, the engaging portion 40b cannot rotate about the axis orthogonal to the longitudinal axis O with respect to the arm portion 20. Therefore, the connection member 40 attached to the proximal-end portion of the arm portion 20 and the hook 70 are in the state in which they are not attachable to and detachable from each other.

According to the clip device 100C of the present embodiment, similar to the clip device 100 according to the embodiment of FIG. 1 to FIG. 11, it is easy to refill the clip unit 10C having a self-expanding force to be re-graspable. The connection member 40 and the cover member 31C form the "switching portion". The switching portion is configured to switch a state (first state) in which the connection member 40 attached to the proximal-end portion of the arm portion 20 and the hook 70 are attachable to each other and detachable from each other and a state (second state) in which the connection member 40 attached to the proximal-end portion of the arm portion 20 and the hook 70 are not attachable to each other and not detachable from each other in a state in which the distal-end portion of the operation wire 52 is regulated from protruding from the distal-end opening 30a of the pressing tube 30C by the stopper 56, that is, in a state in which the hook 70 (link 80) does not protrude from the distal-end opening 30a of the pressing tube 30C.

According to the clip device 100C according to the present embodiment, it is possible to achieve the same effects as that of the embodiment of FIG. 1 to FIG. 11 even when the lateral opening 37 and the lateral opening 57 are not formed.

Although the present embodiment of the present disclosure has been described in detail with reference to the figures, the specific configuration is not limited to what is shown in the figures, and includes design changes and the like within a range that does not deviate from the scope of the present disclosure. In addition, the configurational components shown in the above-described embodiments and modifications can be appropriately combined and configured.

Another exemplary embodiment of the present disclosure will be described with reference to FIG. 20 to FIG. 21. In the following description, the same reference signs will be given to the configurations common to those already described, and duplicate description will be omitted. A clip device 100D according to the present embodiment has a different configuration in the switching portion as compared with the clip device 100 according to the embodiment of FIG. 1 to FIG. 11.

Figure 20:
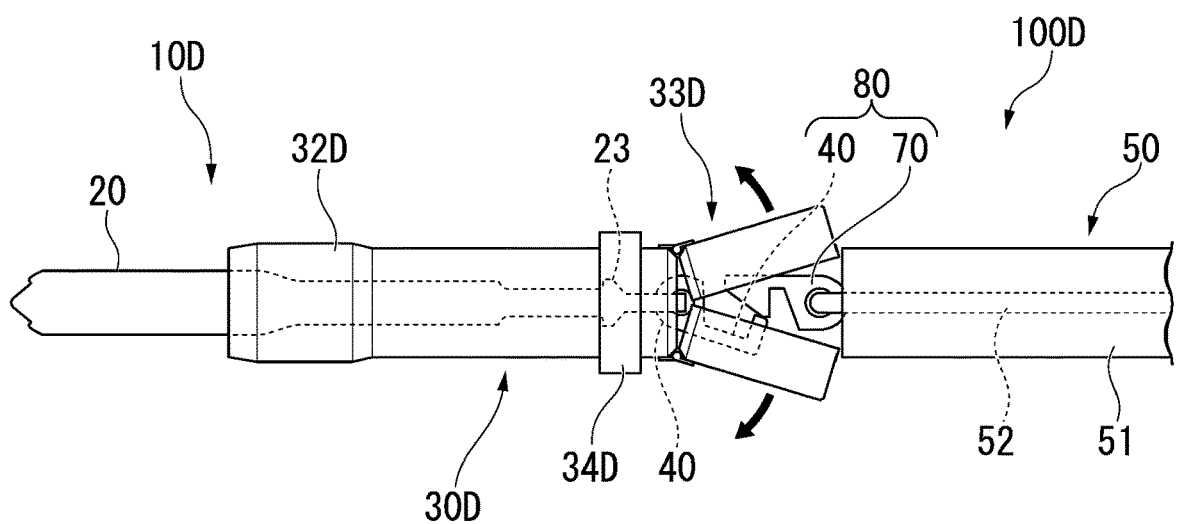
FIG. 20 is a cross-sectional view showing a distal end of a clip device according to an exemplary embodiment of the present disclosure.
Figure 21:
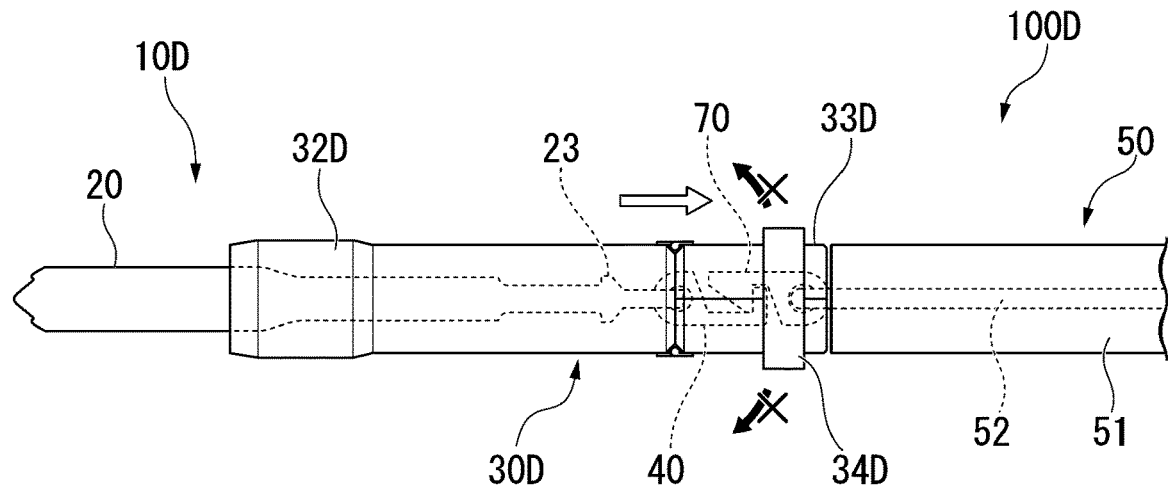
FIG. 21 is a cross-sectional view showing the distal end of the clip device.

FIG. 20 and FIG. 21 are side views showing the distal end of the clip device 100D.

The clip device 100D includes a clip unit (treatment unit) 10D indwelled in the body and an actuator 50 for operating the clip unit 10D.

The clip unit 10D includes an arm portion 20, a pressing tube (holding member) 30D in which a part of the arm portion 20 is accommodated, and the connection member 40.

The pressing tube 30D further includes an open-close member 33D and a ring member 34D as compared with the pressing tube 30B according to the embodiment of FIGS. 16 and 17. The portion other than the open-close member 33D and the ring member 34D of the pressing tube 30D is referred to as the pressing tube main body 32D.

The open-close member 33D is a pair of open-close members provided at the proximal end of the pressing tube main body 32D. The open-close member 33D has a cylindrical shape in the closed state. The open-close member 33D is rotatably attached to the pressing tube main body 32D on the distal-end side thereof.

The ring member (stopper) 34D is a ring-shaped member that can be fitted to the outer circumferential surface of the pressing tube main body 32D and the outer circumferential surface of the closed open-close member 33D. The ring member 34D is slidable between the outer circumferential surface of the pressing tube main body 32D and the outer circumferential surface of the closed open-close member 33D.

The operations and effects of the clip unit 10D configured as described above at the time of refilling will be described.

As shown in FIG. 20, the user slides the ring member 34D toward the side of the pressing tube main body 32D. The open-close member 33D is in a state of being openable and closable. When the open-close member 33D is in the open state and the connection member 40 is exposed to the outside, the connection member 40 attached to the proximal-end portion of the arm portion 20 and the hook 70 are in the state of being attachable to and detachable from each other. As shown in FIG. 20, the user engages the engaging portion 40b of the connection member 40 with the hook 70.

As shown in FIG. 21, the user slides the ring member 34D toward the open-close member 33D side. The open-close member 33D is in the closed state. As a result, the engaging portion 40b cannot rotate about the axis orthogonal to the longitudinal axis O with respect to the arm portion 20. Therefore, the connection member 40 attached to the proximal-end portion of the arm portion 20 and the hook 70 are in the state in which they are not attachable to and detachable from each other.

According to the clip device 100D of the present embodiment, it is easy to refill the clip unit 10D having a self-expanding force to be re-graspable, similar to the clip device 100 according to the embodiment of FIG. 1 to FIG. 11. The connection member 40, the open-close member 33D, and the ring member 34D configure the "switching portion". The switching portion is configured to switch a state (first state) in which the connection member 40 attached to the proximal-end portion of the arm portion 20 and the hook 70 are attachable to each other and detachable from each other and a state (second state) in which the connection member 40 attached to the proximal-end portion of the arm portion 20 and the hook 70 are not attachable to each other and not detachable from each other in a state in which the distal-end portion of the operation wire 52 is regulated from protruding from the distal-end opening 30a of the pressing tube 30D by the stopper 56, that is, in a state in which the hook 70 (link 80) does not protrude from the distal-end opening 30a of the pressing tube 30D.

According to the clip device 100D of the present embodiment, the clip device 100D can exhibit the same effect as that of the embodiment of FIG. 1 to FIG. 11 even in a case in which the lateral opening 37 and the lateral opening 57 are not formed.

Although the present embodiment of the present disclosure has been described in detail with reference to the figures, the specific configuration is not limited to what is shown in the figures, and includes design changes and the like within a range that does not deviate from the scope of the present disclosure. In addition, the components shown in the above-described embodiments and modifications can be appropriately combined and configured.

Another exemplary embodiment of the present disclosure will be described with reference to FIG. 22 to FIG. 23. In the following description, the same reference signs will be designated to the configurations common to those already described, and duplicate description will be omitted. A clip device 100E according to the present embodiment has a different configuration in the switching portion as compared with the clip device 100 according to the embodiment of FIG. 1 to FIG. 11.

Figure 22:
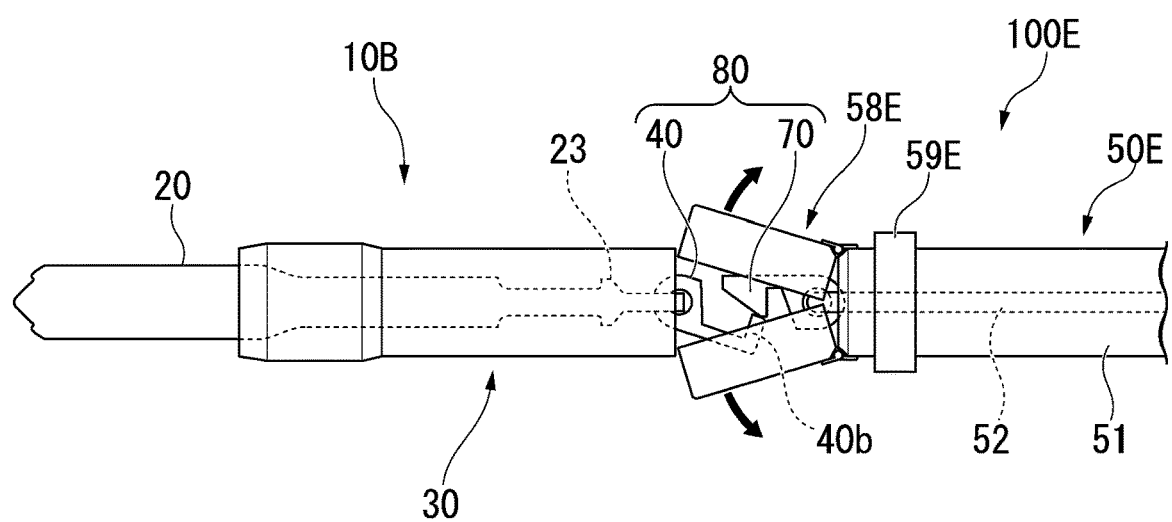
FIG. 22 is a cross-sectional view showing a distal end of a clip device according to an exemplary embodiment of the present disclosure.
Figure 23:
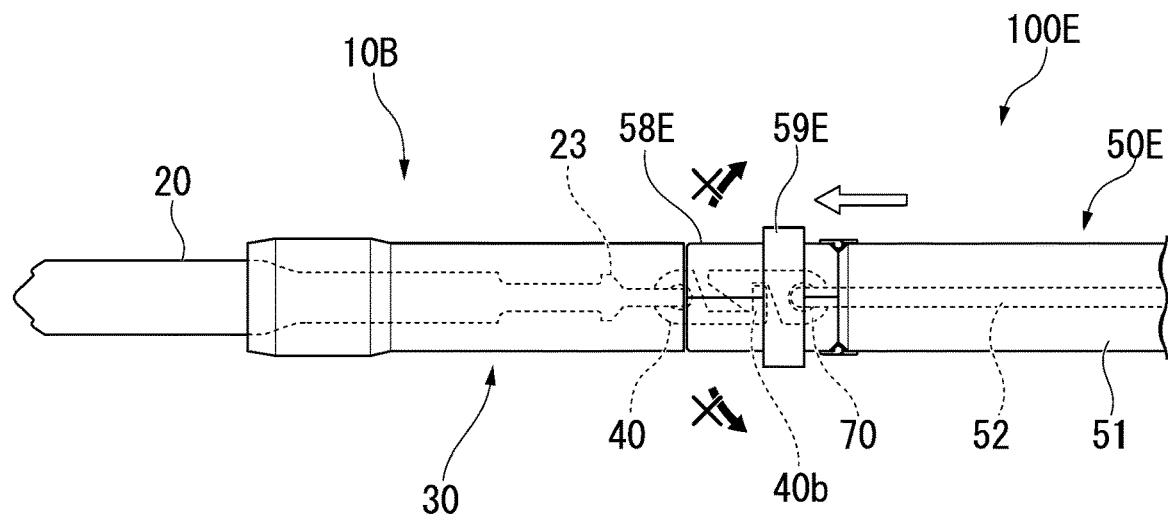
FIG. 23 is a cross-sectional view showing the distal end of the clip device.

FIG. 22 and FIG. 23 are side views showing the distal end of the clip device 100E.

The clip device 100E includes a clip unit (treatment unit) 10B indwelled in the body and an actuator 50E for operating the clip unit 10B.

The actuator 50E includes an elongated insertion portion 51, an operation wire (power transmission member) 52 passed through the insertion portion 51, an operation portion 60 connected to the insertion portion 51, a hook (attachment-detachment portion) 70, an open-close member 58E, and ring member 59E.

The open-close member 58E is a pair of open-close members provided at the distal end of the insertion portion 51. The open-close member 58E has a cylindrical shape in the closed state. The open-close member 58E is rotatably attached to the insertion portion 51 on the proximal-end side thereof.

The ring member (stopper) 59E is a ring-shaped member that can be fitted to the outer circumferential surface of the distal end of the insertion portion 51 and the outer circumferential surface of the closed open-close member 58E. The ring member 59E is slidable between the outer circumferential surface of the distal end of the insertion portion 51 and the outer circumferential surface of the open-close member 58E in the closed state.

The operations and effects of the clip unit 10E configured as described above at the time of refilling will be described.

As shown in FIG. 22, the user slides the ring member 59E toward the distal-end side of the insertion portion 51. The open-close member 58E is in a state of being openable and closeable. When the open-close member 58E is in the open state and the connection member 40 is exposed to the outside, the connection member 40 attached to the proximal-end portion of the arm portion 20 and the hook 70 are in the state of being attachable to and detachable from each other. As shown in FIG. 22, the user engages the engaging portion 40b of the connection member 40 with the hook 70.

As shown in FIG. 23, the user slides the ring member 59E toward the open-close member 58E side. The open-close member 58E is in the closed state. As a result, the engaging portion 40b cannot rotate about the axis orthogonal to the longitudinal axis O with respect to the arm portion 20. Therefore, the connection member 40 attached to the proximal end portion of the arm portion 20 and the hook 70 are in state in which they are not attachable to and detachable from each other.

According to the clip device 100E of the present embodiment, similar to the clip device 100 according to the embodiment of FIG. 1 to FIG. 11, it is easy to refill the clip unit 10B having the self-expanding force to be re-graspable. The connection member 40, the open-close member 58E, and the ring member 59E configure the "switching portion". The switching portion is configured to switch a state (first state) in which the connection member 40 attached to the proximal-end portion of the arm portion 20 and the hook 70 are attachable to each other and detachable from each other and a state (second state) in which the connection member 40 attached to the proximal-end portion of the arm portion 20 and the hook 70 are not attachable to each other and not detachable from each other in a state in which the distal-end portion of the operation wire 52 is regulated from protruding from the distal-end opening 30a of the pressing tube 30 by the stopper 56, that is, in a state in which the hook 70 (link 80) does not protrude from the distal-end opening 30a of the pressing tube 30.

According to the clip device 100E of the present embodiment, the clip device 100E can exhibit the same effects as that of the embodiment of FIG. 1 to FIG. 11 even when the lateral opening 37 and the lateral opening 57 are not formed.

Although the present embodiment of the present disclosure has been described in detail with reference to the figures, the specific configuration is not limited to what is shown in the figures, and includes design changes and the like within a range that does not deviate from the scope of the present disclosure. In addition, the components shown in the above-described embodiments and modifications can be appropriately combined and configured.

Modification Example 3

In the above embodiment, the arm portion 20 has the first arm 21 and the second arm 22; however, the aspect of the arm portion 20 is not limited to this configuration. The arm portion 20 may have a plurality of arms that are openable and closable, and for example, the arm portion 20 may have four arms.

Although exemplary embodiments of the present disclosure have been described above, the present disclosure is not limited to these embodiments. Configurations can be added, omitted, replaced, and other modifications without departing from the scope of the present disclosure.

Further, the present disclosure is not limited by the above description, but is limited only by the appended claims.

What is claimed is:

1. A clip device, comprising:
an arm member;
a holder configured to accommodate at least part of the arm member;
a wire configured to operate the arm member;
a link configured to connect the arm member and the wire; and
a cover disposed radially outward of the link,
wherein the clip device is configured to switch between:
    a first state in which the cover permits the link to move radially when the link is disposed in a first position in a longitudinal direction, and
    a second state in which the cover restricts the link from moving radially when the link is disposed in the first position.

2. The clip device according to claim 1, wherein:
the holder includes a distal-end opening,
the clip device further includes a stopper configured to regulate a distal end of the wire from protruding from the distal-end opening, and
the clip device is configured to switch between the first state and the second state when the distal end of the wire is regulated from protruding from the distal-end opening by the stopper.

3. The clip device according to claim 1, further comprising:
a sheath through which the wire is inserted,
wherein the clip device is configured to switch between the first state and the second state due to a rotation of the holder around the longitudinal axis, a rotation of the link around the longitudinal axis, or a rotation of the sheath around the longitudinal axis.

4. The clip device according to claim 3, wherein the clip device is configured to switch between the first state and the second state by operation of a switching portion comprising:
a lateral opening provided on a lateral surface of the holder or the sheath, wherein at least part of the link is insertable through the lateral opening; and
a support member provided in the sheath, wherein the support member is configured to support the holder and rotate around the longitudinal axis.

5. The clip device according to claim 1, wherein:
the cover is slidably attached to the holder, and
the clip device is configured to switch between the first state and the second state by sliding the cover on the holder in the longitudinal direction.

6. The clip device according to claim 1, further comprising:
a sheath through which the wire is inserted,
wherein the clip device is configured to switch between the first state and the second state by enlarging an inner diameter of the holder or an inner diameter of the sheath.

7. The clip device according to claim 1, further comprising a sheath through which the wire is inserted,
wherein the cover is a part of the holder, a part of the sheath, or a tube member.

8. The clip device according to claim 7, further comprising an opening provided on a lateral surface of the holder or the sheath, wherein at least part of the link is insertable through the opening.

9. The clip device according to claim 7, wherein the cover is the tube member, and the tube member is slidably attached to the holder.

10. The clip device according to claim 7, further comprising:
an open-close member provided on the holder or the sheath.

11. The clip device according to claim 10, further comprising a stopper configured to prevent the open-close member from opening.

12. The clip device according to claim 1, wherein:
the link is a hook fixed to the arm member, and
the link is configured to detachably connect the arm member and the wire by displacing in a direction separating from the longitudinal axis.

13. The clip device according to claim 1, wherein:
the link is a hook fixed to the wire, and
the link is configured to detachably connect the arm member and the wire by displacing in a direction separating from the longitudinal axis.

14. The clip device according to claim 1, wherein:
in the first state, the arm member and the wire are attachable to each other and detachable from each other, and
in the second state, the arm member and the wire are not attachable to each other and not detachable from each other.

15. The clip device according to claim 1, further comprising:
a sheath through which the wire is inserted, and
a stopper provided on the wire, the stopper being configured to restrict the wire from moving towards a distal end in the longitudinal direction,
wherein when a movement of the wire is restricted by the stopper, the link is positioned in the first position.

16. The clip device according to claim 1, further comprising a sheath through which the wire is inserted,
wherein:
in the first state, the link is exposed from the holder or the sheath, and
in the second state, the link is housed in the holder or the sheath.

17. The clip device according to claim 16, wherein the cover is slidably attached to the holder.

18. The clip device according to claim 1, wherein:
in the first state, the link is configured to move to be positioned more radially outward than the holder.

19. The clip device according to claim 1, wherein:
when the link moves to a second position proximal of the first position, the link separates the arm member and the wire.

20. The clip device according to claim 19, further comprising a sheath through which the wire is inserted,
wherein when the link is disposed in the second position, the link is housed in the sheath.

* * * * *